United States Patent
Lavigne et al.

(10) Patent No.: US 9,523,343 B2
(45) Date of Patent: Dec. 20, 2016

(54) POWER-CONVERSION INSTALLATION INCLUDING A HYDRAULIC MACHINE PROVIDED WITH A RUNNER

(75) Inventors: Sylvain Lavigne, Eybens (FR); Jean-Bernard Houdeline, Chirens (FR); Claude Beral, Veurey Voroize (FR)

(73) Assignee: ALSTOM Renewable Technologies, Grenoble (FR)

(*) Notice: Subject to any disclaimer, the term of this patent is extended or adjusted under 35 U.S.C. 154(b) by 545 days.

(21) Appl. No.: 14/113,206

(22) PCT Filed: Apr. 20, 2012

(86) PCT No.: PCT/EP2012/057285
§ 371 (c)(1),
(2), (4) Date: Oct. 21, 2013

(87) PCT Pub. No.: WO2012/143518
PCT Pub. Date: Oct. 26, 2012

(65) Prior Publication Data
US 2014/0050587 A1  Feb. 20, 2014

(30) Foreign Application Priority Data

Apr. 20, 2011  (FR) ..................... 11 53428

(51) Int. Cl.
*F03B 3/02* (2006.01)
*F03B 3/12* (2006.01)

(52) U.S. Cl.
CPC . *F03B 3/12* (2013.01); *F03B 3/02* (2013.01); *F03B 3/121* (2013.01); *F03B 3/125* (2013.01);
(Continued)

(58) Field of Classification Search
CPC ............. F03B 3/125; F03B 3/12; F03B 3/121;
F03B 3/02; F03B 3/10; F03B 3/103; F03B 3/00; F04D 29/2216; F04D 29/007; F04D 29/2283; F04D 29/2255; F04D 29/245
(Continued)

(56) References Cited

U.S. PATENT DOCUMENTS

| 147,351 A | 2/1874 | Tyler |
|---|---|---|
| 4,479,757 A | 10/1984 | Holmes et al. |
| 2005/0013691 A1 | 1/2005 | Enomoto et al. |

FOREIGN PATENT DOCUMENTS

| CA | 2438429 A1 | 2/2005 |
|---|---|---|
| CN | 102016295 A | 4/2011 |

(Continued)

OTHER PUBLICATIONS

Office Action issued on Feb. 11, 2015, by the Russian Patent Office in corresponding Russian Patent Application No. 2013151262, and an English Translation of the Office Action. (15 pages).

(Continued)

*Primary Examiner* — Richard Edgar
(74) *Attorney, Agent, or Firm* — Dority & Manning, P.A.

(57) ABSTRACT

The invention relates to a Francis runner (200) for a hydraulic machine, comprising: a wheel (1), which is rotationally symmetrical about an axis of rotation (Z) of the runner (200); a crown (12); and a plurality of inwardly curved vanes (21), each of which has a peripheral edge (212). The peripheral edge (212) of at least one of the vanes is curved, the concavity thereof facing toward the outside of the runner (200). The maximum value of the distance measured between any point on the peripheral edge (202) and a straight line passing through a first connection point between the peripheral edge (212) and the wheel (1), and through a second connection point between the peripheral edge (212) and the crown (12), is at an intermediate point on the peripheral edge (212). The radius (Rn) from the intermediate point (N) is strictly smaller than the radius (Ra) from the first (Continued)

connection point (A). The radius (Rn) from the intermediate point (N) is strictly smaller than the radius (Rc) from the second connection point (C).

16 Claims, 6 Drawing Sheets

(52) U.S. Cl.
CPC ...... *F05B 2240/30* (2013.01); *F05B 2250/712* (2013.01); *Y02E 10/223* (2013.01)

(58) Field of Classification Search
USPC .............................. 416/186 R, 184, 182, 179
See application file for complete search history.

(56) References Cited

FOREIGN PATENT DOCUMENTS

| | | |
|---|---|---|
| DE | 323 190 C | 7/1920 |
| DE | 102 10 426 A1 | 10/2003 |
| JP | H10-318117 A | 12/1998 |
| JP | 2007-064018 A | 3/2007 |
| JP | 2010168903 A * | 8/2010 |
| KR | 10-2006-0061278 A | 6/2006 |
| KR | 10-2010-0120710 A | 11/2010 |
| RU | 2321766 C2 | 4/2008 |
| WO | WO 98/05863 A1 | 2/1998 |
| WO | 2004-031573 A1 | 4/2004 |

OTHER PUBLICATIONS

International Search Report re Application No. PCT/EP2012/057285, mailed on Aug. 1, 2012.

Office Action (First Office Action) issued on Jun. 25, 2015, by the Chinese Patent Office in corresponding Chinese Patent Application No. 201280019539.0, and an English Translation of the Office Action. (14 pages).

Office Action (Decision of Patent Grant) issued on Aug. 1, 2015, by the Korean Patent Office in corresponding Korean Patent Application No. 10-2013-7029737, and an English Translation of the Office Action. (3 pages).

\* cited by examiner

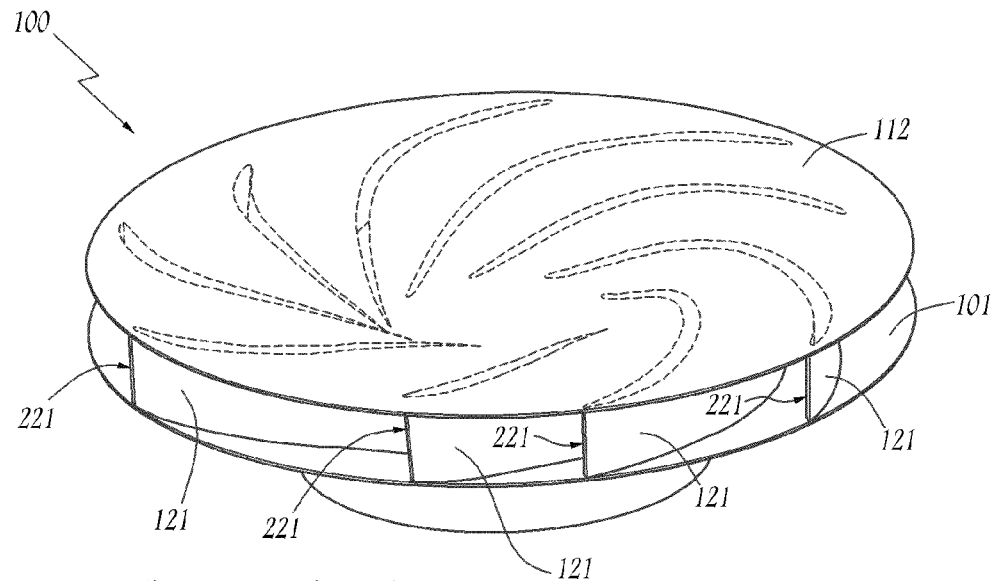
Fig.1 - Prior Art
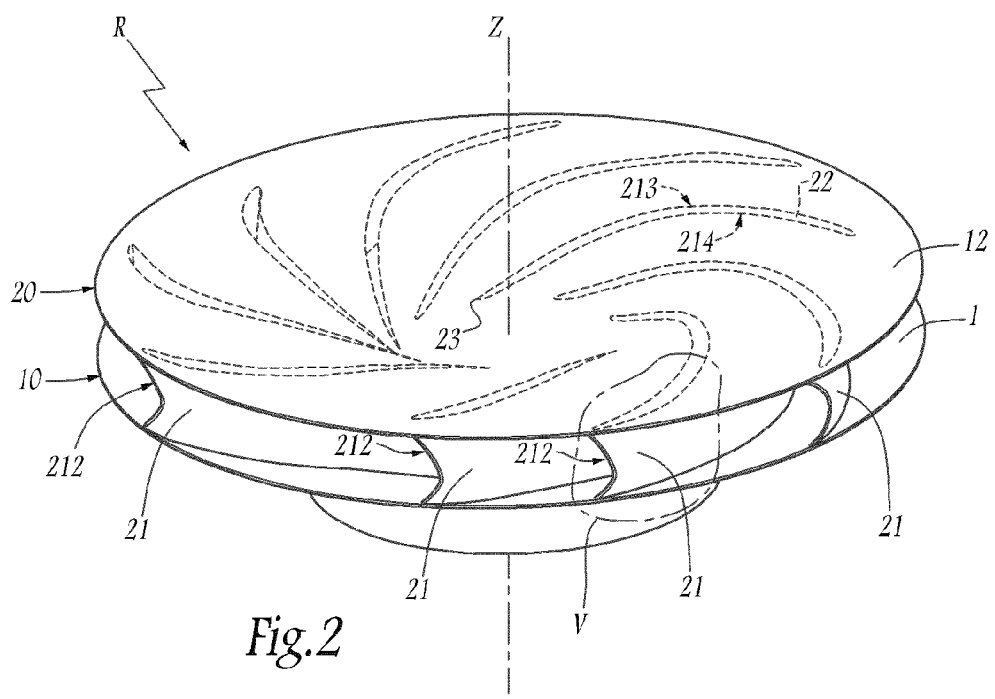
Fig.2

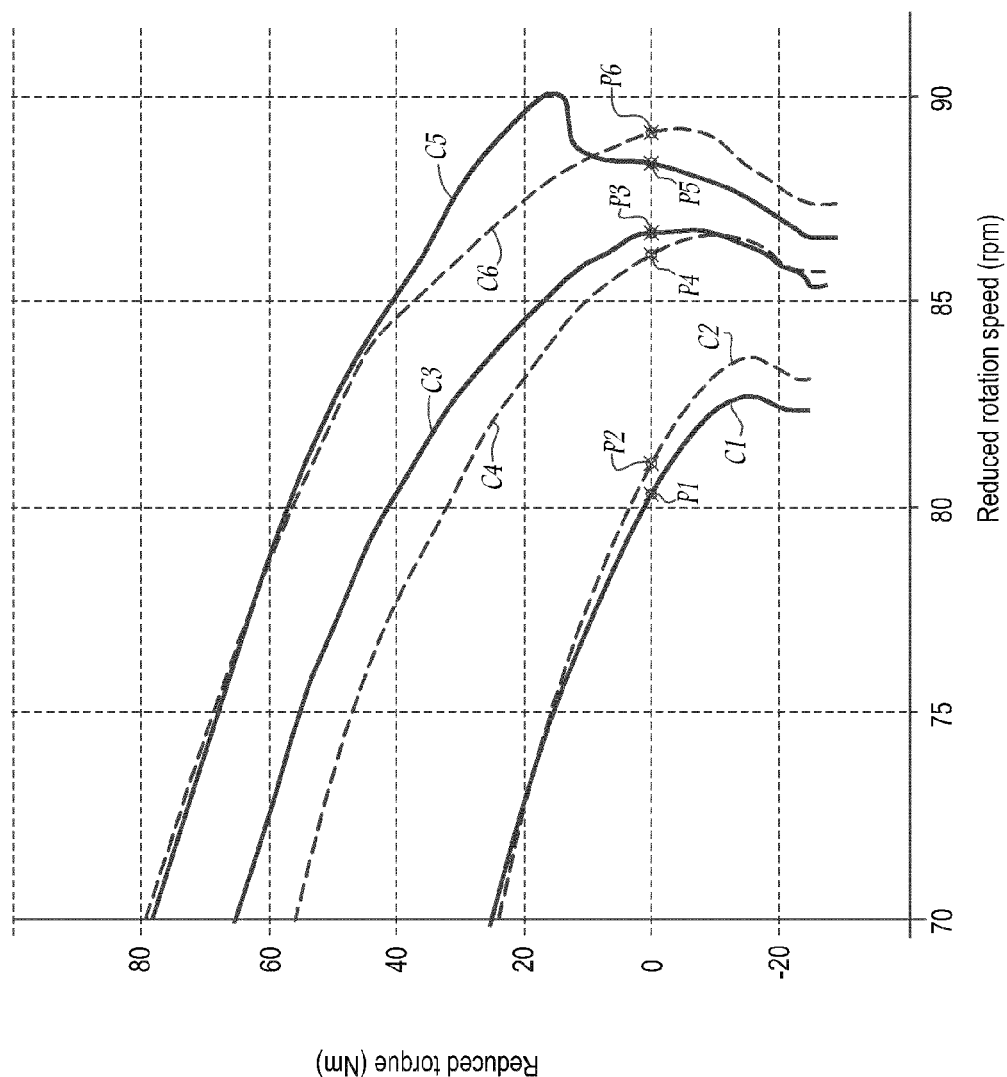

POWER-CONVERSION INSTALLATION INCLUDING A HYDRAULIC MACHINE PROVIDED WITH A RUNNER

CROSS-REFERENCE TO RELATED APPLICATIONS

This application is a U.S. National Phase of International Application No.: PCT/EP2012/057285, filed Apr. 20, 2012, designating the U.S., and published in French as WO 2012/143518 on Sep. 13, 2012, which claims the benefit of French Patent Application No. 1153428 filed Apr. 20, 2011.

This invention relates to a Francis runner for a hydraulic machine intended to be passed through by a forced flow of water. When the machine is a turbine, such a flow has for effect to drive the runner in rotation and when the machine is a pump, such a flow results from this rotation. Moreover, this invention relates to a hydraulic machine provided with such a runner. On the other hand, this invention relates to a power-conversion installation including such a hydraulic machine.

Conventionally, installation for converting hydraulic power into electrical power comprises a hydraulic machine which operates in turbine mode and which is passed through by a forced flow of water of which the rate is controlled by a distributor. The runner of the turbine drives in rotation a shaft connected to an alternator. In order to couple the alternator to the electrical network, the rotation speed of the turbine must be stable, in order for the frequency of the electrical signal at the output of the alternator to be equal to the frequency of the electrical network. The frequency of the electrical network is 50 Hz in Europe, but this value can be 60 Hz in other territories, for example in the United States. As long as the machine is not coupled to the network, the torque of the runner is zero. During transient operating phases, pressure fluctuations in the flow cause instabilities, in such a way that the rotation speed of the runner of the turbine is not stabilised and the alternator cannot be coupled to the electrical network. In particular, during the starting of the turbine, the distributor opens gradually, causing oscillations of the rotation speed of the runner of the turbine. Then, when the desired opening of the distributor is reached, the alternator is coupled to the electrical network as soon as the rotation speed of the runner is stable and reaches a synchronous speed.

FIG. 1 shows a Francis runner 100 from prior art, which comprises a wheel 101 and a crown 112 facing the wheel 101. The runner 100 comprises, furthermore, nine vanes 121 integral with the wheel 101 and with the crown 112 and which extend between the wheel 101 and the crown 112. Each vane 121 has a straight leading edge 221 which is firstly passed through by a forced flow of water, when the runner belongs to a hydraulic machine which is operating in turbine mode.

The graph of FIG. 4 shows, on the x-axis, a magnitude referred to as "reduced rotation speed", expressed in rpm, proportional to the ratio of the rotation speed of the runner of a turbine over the square root of the head, and, on the y-axis, a magnitude referred to as "reduced torque", expressed in Nm and proportional to the ratio of the torque exerted by the runner, over the head. Each curve C1 to C6 of the graph gives the reduced torque of the runner according to its reduced rotation speed, for the constant opening of a distributor arranged upstream of this runner. The curves in solid lines C1, C3 and C5 correspond to the operation of a turbine provided with the runner 100 of prior art, and the curves in dotted lines C2, C4 and C6 correspond to the operation of a turbine provided with a runner in accordance with the invention.

The small reduced rotation speeds of the turbine, on the left portion of the graph, correspond to large heads, while the large reduced rotation speeds of the turbine, on the right portion of the graph, correspond to small heads. The points P1 to P6 are located respectively at the intersection between the curves C1 to C6 and a horizontal straight line corresponding to a zero reduced torque. The points P1 to P6 therefore give a reduced rotation speed of the runner making it possible to couple the alternator to the electrical network. It is known that, in such a graph, the operating points for which the slope of the curve is negative correspond to a stable operation of the turbine, in other words at a stable rotation speed of the runner. Inversely, the operating points for which the slope of the curve is positive correspond to an unstable rotation speed of the runner, which does not make it possible to couple the alternator to the network. Conventionally, it is sought to be able to operate the turbine for the smallest heads possible, while still retaining a negative slope.

For the runner 100 of prior art, it is observed that for the point P1, which corresponds to a first opening of the distributor for a relatively substantial head, the slope of the curve C1 is negative and the rotation speed is stable. With regards to the point P3, which corresponds to smaller head for a second opening of the distributor, the curve C3 is approximately vertical which means that the rotation speed of the runner 100 of prior art is not very stable. Finally, the curve C5 is in the shape of an S and its slope at the point P5 is positive, which corresponds to an unstable rotation speed of the runner 100.

In conclusion, the runner 100 of prior art does not make it possible, alone, to stabilise its rotation speed for relatively small heads.

With the purpose of stabilising the rotation speed of a runner of prior art, it is known to use a turbine with an additional coupling device which consists in desynchronising wicket gates. These wicket gates are distributed around the runner and can be desynchronised, i.e. it is possible to orient them differently in relation to one another in order to vary around the runner the rate of the flow for the purposes of obtaining a curve with a negative slope in what is shown in FIG. 4. However, desynchronising the wicket gates requires, on the one hand, the installing of servomotors for manoeuvring the wicket gates to be desynchronised and, on the other hand, the installing of a suitable control programme.

US-2005/013691 discloses a Francis runner comprising a crown and a belt, between which extend vanes having an inwardly curved leading edge of which the convexity is circumferential. As such, the leading edges each comprise an intermediate point, located at the bottom of the curved shape of the leading edge. This runner has a geometry such that the radius of a first connection point between the leading edge and the crown is smaller than the radius of the intermediate point. This geometry does not make it possible to improve the stability of the rotation speed of the runner, during the coupling phases on the electrical network.

It is these disadvantages more particularly that the invention intends to overcome by proposing a turbine runner of which the specific geometry makes it possible to stabilise the rotation speed of the runner during transient starting phases, for relatively small heads.

To this effect, the invention has for purpose a Francis runner for a hydraulic machine, intended to be passed through by a forced flow of water, comprising:
- a wheel which is rotationally symmetrical about an axis of rotation of the runner,
- a crown which is rotationally symmetrical about the axis of rotation and facing the wheel,
- a plurality of inwardly curved vanes, integral with the wheel and with the crown and each having a central edge in the vicinity of the axis of rotation and a peripheral edge, opposite the central edge, which extends between the wheel and the crown and which is intended to firstly be passed through by the flow when the hydraulic machine is operating in turbine mode. In other words, when the hydraulic machine is operating in turbine mode, the flow runs from the peripheral edge towards the central edge.

The peripheral edge of at least one vane is curved, the concavity thereof facing toward the outside of the runner. A first distance, measured between any point on the peripheral edge and a straight line passing through, on the one hand, a first connection point between the peripheral edge and the wheel and, on the other hand, a second connection point between the peripheral edge and the crown is maximal on an intermediate point on the peripheral edge. The radius of the intermediate point is strictly smaller than the radius of the first connection point. The radius of the intermediate point is strictly smaller than the radius of the second connection point.

Due to the hollow shape of the peripheral edge of the vanes, which correspond to the leading edge when the hydraulic machine is operating in turbine mode, the turbine is made to operate for smaller heads, while still retaining a negative slope at the operating points making it possible to couple the alternator to the electrical network. This makes it possible to obtain a stable rotation speed and to rapidly couple the turbine to the electrical network without the need to add an additional coupling device, in particular, for small heads.

According to advantageous but not mandatory aspects of the invention, such a runner can incorporate one or several of the following characteristics, taken in any technically permissible combination:
- The intermediate point is the furthest from the straight line.
- The orthogonal projection of the intermediate point on the straight line is located in a zone which extends along the straight line and which is centred on the middle of the straight line. The height of the zone is less than 80% of a height of each vane, measured between the first connection point and the second connection point, more preferably less than 10%.
- The peripheral edge of the vanes is in the shape of a portion of circle, ellipse, parabola, or even any curve.
- A first ratio, having:
  - as denominator, a height of a vane measured between the first connection point and the second connection point,
  - as numerator, a maximum distance between the straight line and the peripheral edge,
  is between 0% and 200%, more preferably between 30% and 80%.
- The intermediate point of the peripheral edge is located midway between the connection points.
- In a first plane, parallel to the axis of rotation and perpendicular to a second plane which passes through an intersection between the crown and an average surface of the vane located between an external face and an internal face of the vane, and which extends this average surface, the external face is convex and the internal face is concave.
- In the first plane, the external face and the internal face are in the shape of a portion of circle, ellipse, parabola, and even any curve.
- A second ratio, having:
  - as denominator, a height of the vane, measured between the first connection point and the second connection point,
  - as numerator, a maximum distance, measured parallel to the first plane, between the straight line and the peripheral edge,
  is between 0% and 200%, more preferably between 10% and 40%.
- In the first plane, the intermediate point on the peripheral edge is located midway between the connection points.
- In the first plane, the peripheral edge is curved, with the concavity thereof facing in the same direction as the direction of rotation in turbine mode of the runner.
- A second distance, measured parallel to the first plane, between any point on the peripheral edge and the straight line, is maximal at the intermediate point.

The invention also has for purpose a hydraulic machine provided with such a runner.

Advantageously, when the machine is operating in turbine mode, the flow first hits the external face of the vanes.

Finally, the invention relates to power-conversion installation including such a hydraulic machine.

The invention shall be well understood other advantages of the latter shall appear when reading the following description of a runner provided on a hydraulic machine which belongs to a power-conversion installation, given solely by way of example and in reference to the annexed drawings wherein:

FIG. 1 is a perspective view of a runner of a hydraulic machine of prior art;

FIG. 2 is a view similar to FIG. 1 of a runner of a hydraulic machine in accordance with the invention;

FIG. 4 is a graph which shows six curves, of which three in solid lines show the rotation speed of the runner of FIG. 1 according to its torque, and three in dotted lines show the rotation speed of the runner of FIG. 2 according to its torque;

Figure 3:
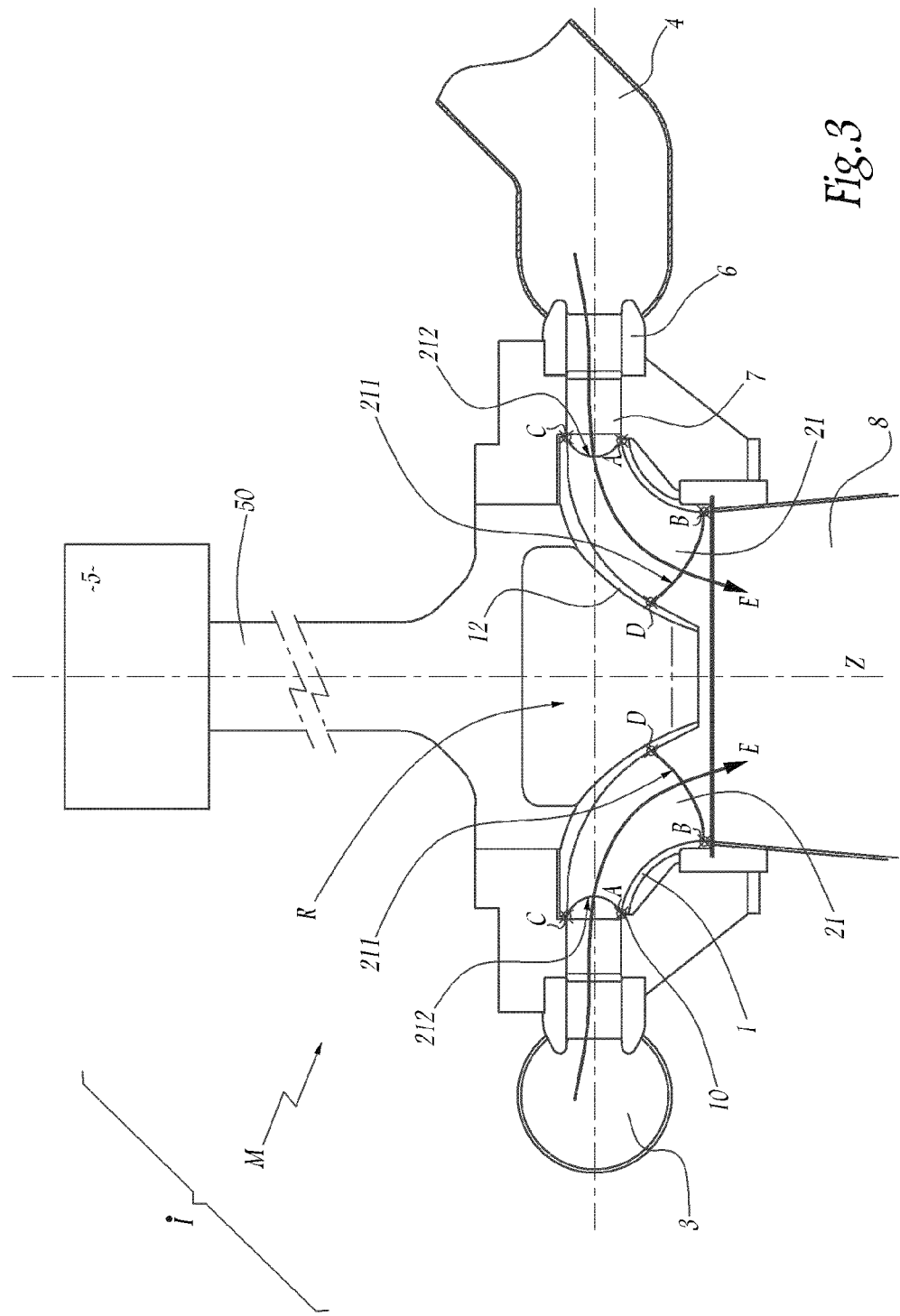
FIG. 3 is a block cross-section of a power-conversion installation provided with a hydraulic machine comprising the runner of FIG. 2.

The installation I shown in FIG. 3 comprises a reversible hydraulic machine M, which is a Francis pump-turbine, of which the runner R is supplied with water using a tarp 3 wherein exits a forced duct 4 when the machine M is operating in turbine mode. In service, the runner 200 rotates about a vertical axis of rotation Z. When the machine M is operating in turbine mode, the runner 200 rotates in a direction of rotation R1, about the axis Z, which corresponds to the clockwise direction when the runner R is viewed from above. In order to produce electricity en turbine mode, the machine M is coupled to an alternator 5 by a shaft 50 rotating about the axis Z. Between the tarp 3 and the runner R are arranged static pre-wicket gates 6 and directional wicket gates 7, of which the function is to guide a flow of water E, coming from the duct 4 and intended to pass through the runner R, in the direction of a drainage duct 8. The wicket gates 7 also provide the function of a distributor as they make it possible to regulate the rate of the flow E.

FIG. 2 shows the runner R in accordance with the invention, which comprises a wheel 1 and a crown 12 facing the wheel 1. The wheel 1 and the crown 12 are rotationally symmetrical about the axis Z. The wheel 1 and the crown 12 have respectively an external peripheral edge 10 and 20 centred on the axis Z. The surfaces of the wheel 1 and of the crown 12 have complex shapes, generated by the rotation, around and at a distance from the axis Z, of a curve segment.

The runner R comprises, furthermore, nine vanes 21 integral with the wheel 1 and with the crown 12 and which extend between the wheel 1 and the crown 12 about the axis Z. In FIG. 2, the connection zones between the vanes 21, on the one hand, and the crown 2, on the other hand, are shown as dotted lines.

An object here is qualified as "central" when it is located in the vicinity of the axis Z, in opposition to the adjective "peripheral" which designates an object which is separated from the axis Z.

Each vane 21 has an inwardly curved shape between a peripheral end 22 of the vane 21 and a central end 23 of the vane 21. This inwardly curved shape constitutes a main curvature of the vane 21 essentially in the shape of a portion of a spiral. Each vane 21 has a peripheral edge 212, located at the periphery of the wheel 1 and a central edge 211, facing toward the axis Z. Each vane 21 is delimited par an external face 213, outside of the main curvature of the vane 21, and par an internal face 214, inside the main curvature of the vane 21. The faces 213 and 214 join together on the central edge 211 and on the peripheral edge 212.

Figure 9:
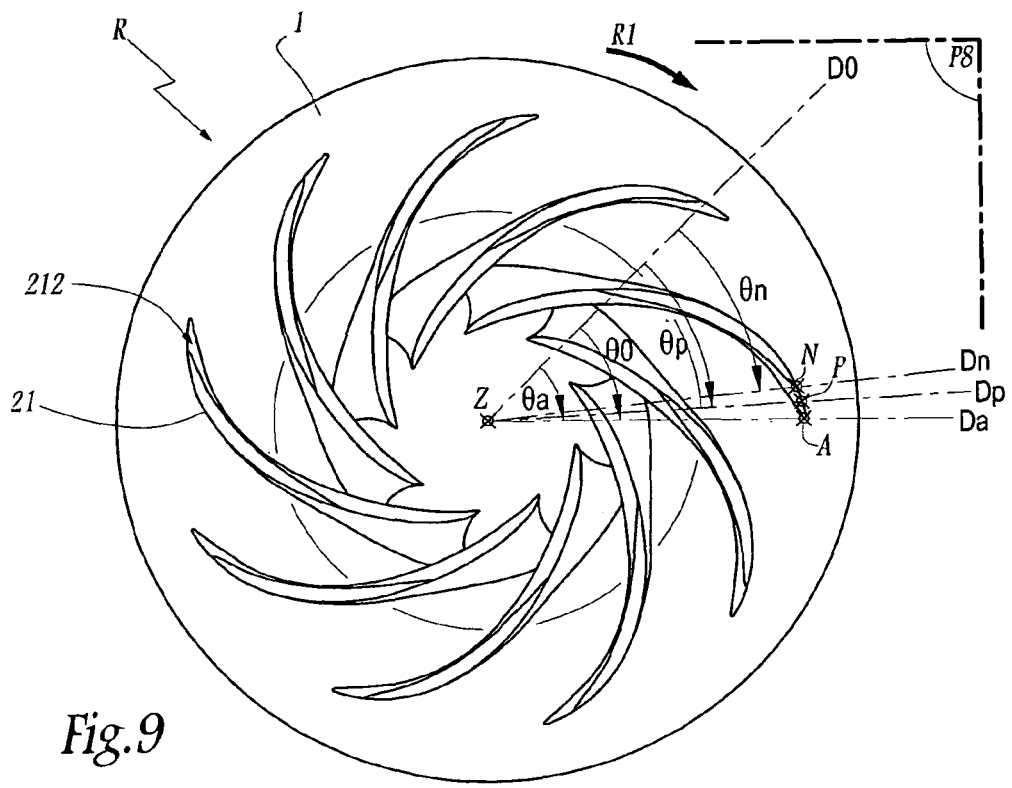
FIG. 9 is a cross-section, as a top view, of the runner of FIG. 2, according to the plane P8 in FIG. 7, with the crown of the runner not being shown.
Figure 10:
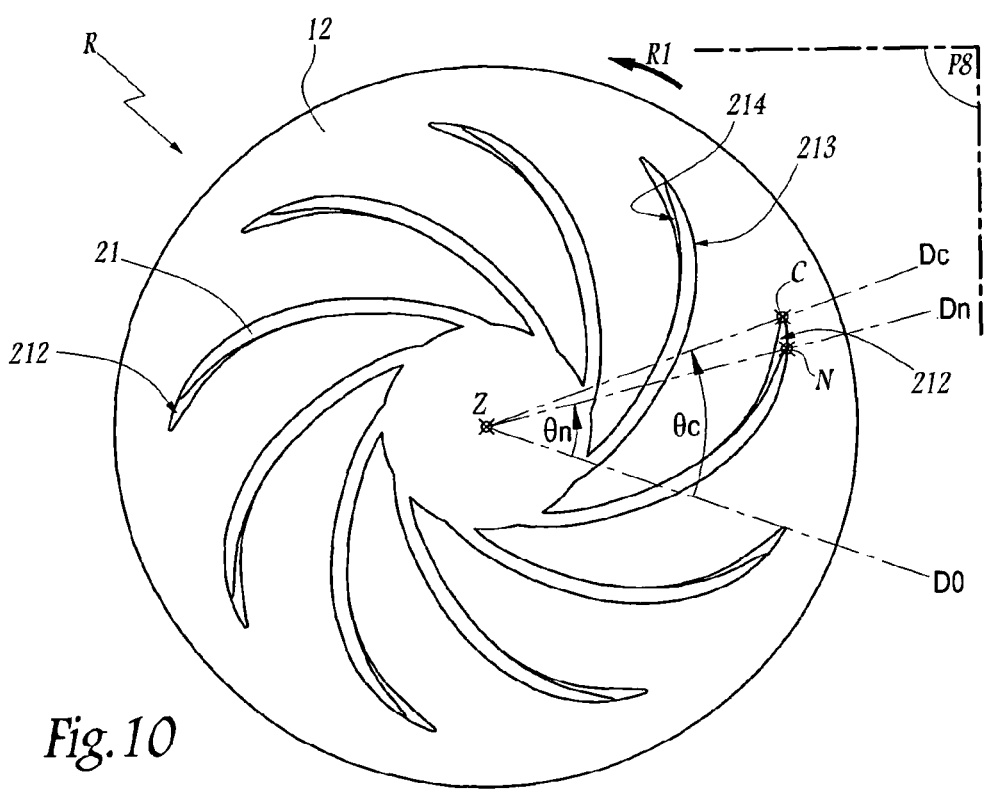
FIG. 10 is a cross-section, as a bottom view, of the runner of FIG. 2, according to the plane P8 in FIG. 7, with the belt of the runner not shown.

When the machine M is operating in turbine mode, the flow E first hits the external face 213 of the vanes 21. As can be seen in FIGS. 9 and 10, in a cut plane perpendicular to the axis of rotation Z, the external face 213 of each vane 21 is convex and the internal face 214 is concave.

When the hydraulic machine M is operating in turbine mode, the peripheral edge 212 of each vane 21 forms a leading edge and the central edge 211 forms a trailing edge. The leading edge is intended to be passed through firstly by the flow E when the hydraulic machine M is operating in turbine mode. In other words, in turbine mode, the fluid flows from the peripheral edge towards the central edge. The description given hereinafter for the turbine mode uses these expressions "leading edge" and "trailing edge"; it can be transposed to the case where the runner is operating in pump mode by inverting these expressions.

A denotes the connection point of the wheel 1 with the leading edge 212 of each vane 21. B denotes the connection point of the wheel 1 with the trailing edge 211 of each vane 21. Similarly, C denotes the connection point of the crown 12 with the leading edge 212 of each vane 21 and D denotes the connection point of the crown 12 with the trailing edge 211 of each vane 21.

Ra, Rb, Rc or Rd respectively denote the radius of the point A, B, C or D. Each radius Ra, Rb, Rc and Rd is the distance, measured radially, between the axis Z and the point A, B, C or D.

The radius Rd is smaller than the radius Rb. The radiuses Ra and Rc are equal and are strictly larger than the radiuses Rb and Rd. In particular, the radius Rc is strictly larger than the radius Rb, which allows the machine M to be able to operate in pump mode, with satisfactory performance. When the machine M is operating in turbine mode, the pressure of the flow E, on point C, is greater than on point B.

Figure 6:
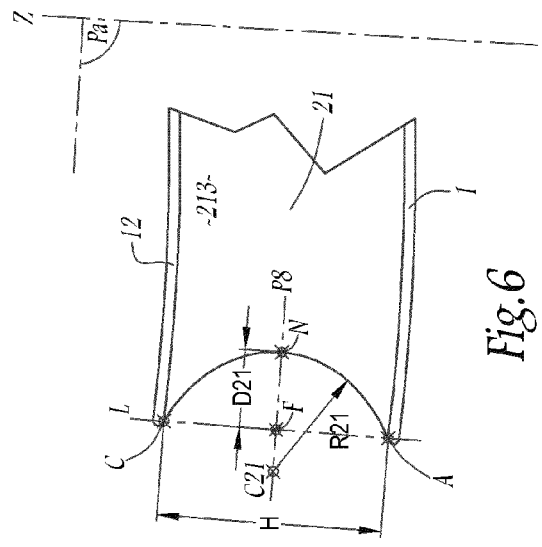
FIG. 6 is a view of a vane belonging to the runner of FIG. 2, according to the arrow F6 in FIG. 5.
Figure 7:
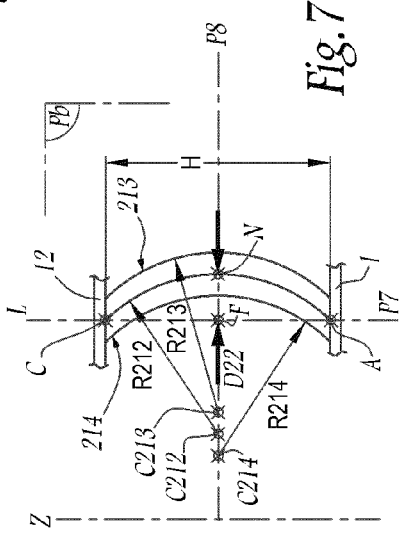
FIG. 7 is a view, on a greater scale, of the vane of FIG. 6, according to the arrow F7 in FIG. 5.
Figure 5:
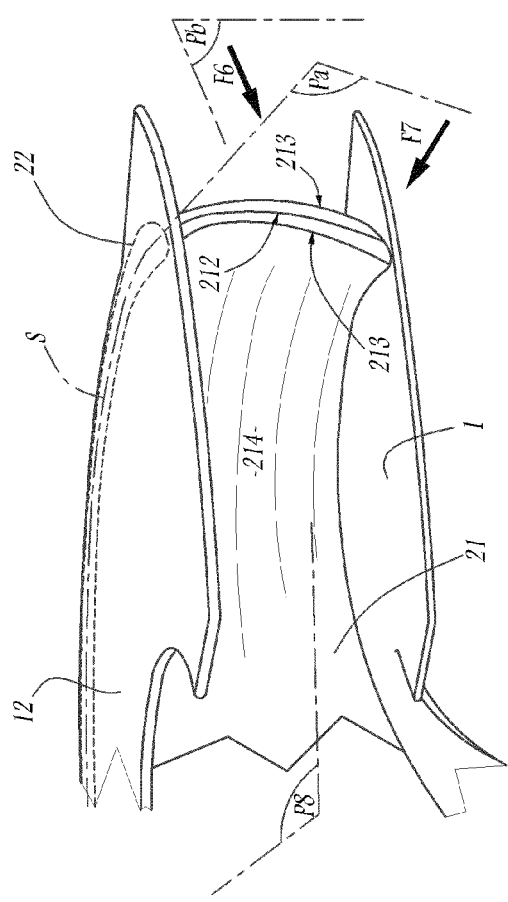
FIG. 5 is a partial perspective view, under another angle and on a greater scale, of the detail V in FIG. 2.
Figure 8:
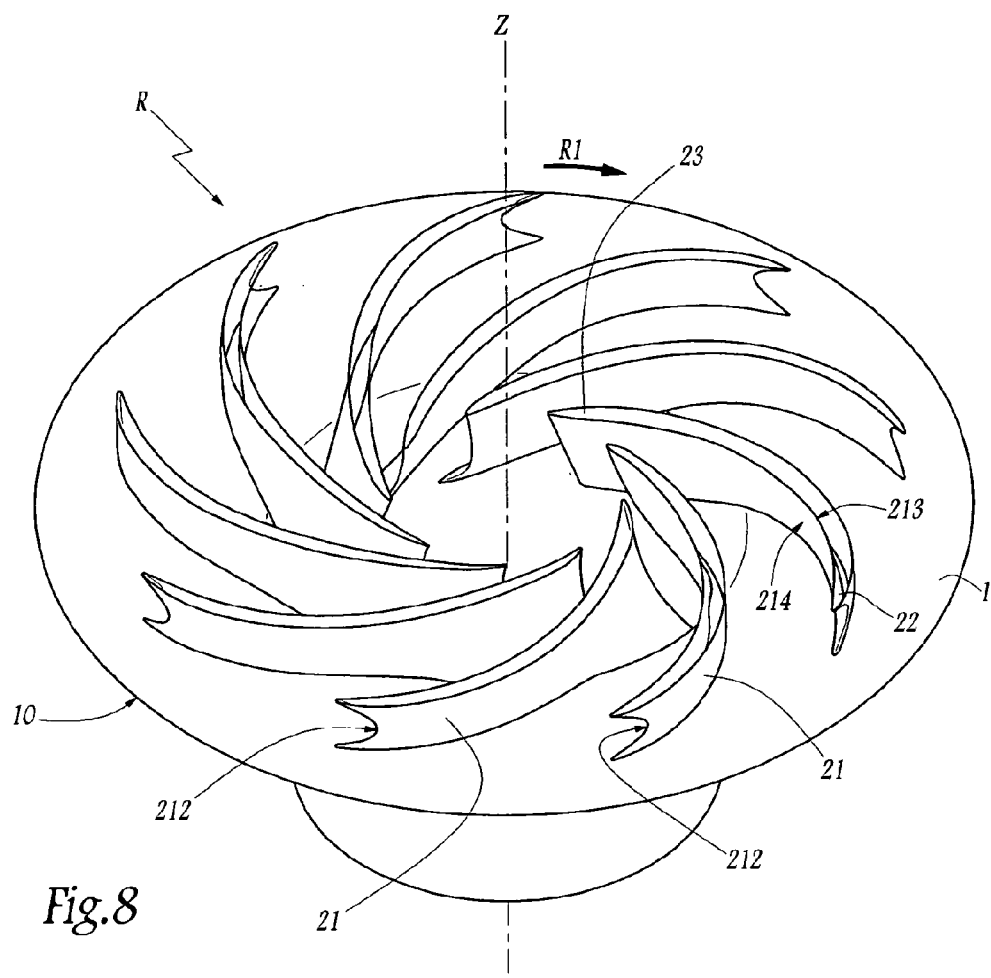
FIG. 8 is a perspective view of the runner of FIG. 2.

FIGS. 5 to 7 show in more detail the peripheral end 22 of one of the vanes 21, with the understanding that the other vanes 21 are similar.

S denotes an average surface of each vane 21 passing between the external 213 and internal 214 faces of the vane 21, at an equal distance from these faces. On the peripheral end 22 of the vane 21, the average surface S coincides with the leading edge 212. The surface S is shown in FIG. 5, via its trace on the crown 12.

L denotes a straight line passing through the points A and C of the leading edge 212. The straight line L is parallel to the axis of rotation Z of the runner R. Pa denotes a plane which passes through the straight line L and which is located in the extension of the average surface S on its intersection with the crown 12. The plane Pa passes through the semi-tangent to the left T of the peripheral end S1 of the trace on the crown 12 of the average surface S.

FIG. 6 is a view according to an arrow F6 perpendicular to the plane Pa, and which faces the external face 213 of the vane 21.

The leading edge 212 is curved and does not have any discontinuity. In other terms, the leading edge 212 is hollowed in the direction of the trailing edge 211, and its shape does not have any breaks. As such, the concavity of the leading edge 212 is facing toward the outside of the vane 21 and of the runner R, in particular in the plane Pa or in a plane parallel to the faces 213 or 214, in the vicinity of the leading edge 212.

In the plane Pa, the curved shape, hollowed, of the leading edge 212 is defined by a portion of circle, as is shown in FIG. 6. C21 denotes the centre of the leading edge 212 in the plane Pa and R21 its radius.

The leading edge 212 is symmetrical in relation to a plane P8 perpendicular to the straight line L which passes through an intermediate point N on the leading edge 212. The point N is the point on the leading edge 212 the furthest from the straight line L.

D21 denotes a distance between the point N and the straight line L and H denotes a height of the leading edge 212, measured between the points A and C, along the straight line L. The distance D21 is the maximum distance between the leading edge 212 and the straight line L.

In the example shown, the distance D21 is measured perpendicularly to the straight line L. Let d1 be the distance between the straight line L and any point P on the leading edge 212, measured perpendicularly to the straight line L. Let G be the orthogonal projection of the point P on the straight line L. The distance d1 is measured between the points P and G. The distance d1 is the projection of the vector $\overrightarrow{PG}$ in the plane Pb. The distance d1 is zero at the point A and increases between the points A and N. At the point N, the distance d1 is maximal and is equal to the distance D21. Between the points N and C, the distance d1 decreases. At the point C, the distance d1 is zero.

As such, along the leading edge 212 and between the points A and C, the distance d1, expressed as a function of a distance L1 between the point A and the point G, comprises a single maximum and does not comprise any point of inflection.

The derivative of the distance d1 in relation to the distance L1 is positive between the points A and N, cancels out at the point N and is negative between the points N and C. The second derivative of the distance d1 in relation to the distance L1 is negative between the points A and C.

A ratio having, as numerator, the distance D21 and, as denominator, the height H, is between 0% and 200%, more preferably between 30% and 80%.

F denotes a point of intersection between the straight line L and the plane P8. The distance between the point A and the point F is equal to the distance between the point F and the point C. In other words, the plane P8 is located midway between the points A and C, along the straight line L.

Rn denotes the radius of the point N, i.e. the distance, measured radially, between the axis Z and the point N. The distance Rn is strictly less than the distance Ra and than the distance Rc.

FIG. 7 is a view of the external end 22 of the vane 21 of FIG. 5, according to an arrow F7, contained in the plane Pa, and perpendicular to the straight line L. FIG. 7 is therefore a view in a plane Pb perpendicular to the plane Pa.

As can be seen in FIG. 7, the veil of the vane 21 is curved towards the exterior of the runner R. In other terms, in the plane Pb, the external face 213 is convex and the internal face 214 is concave. This secondary curvature of the vanes 21 is continuous and does not have any breaks.

More precisely, in the plane Pb, the external surface 213, the internal surface 214 and the average surface S, which coincides with the leading edge 212, are each defined by a portion of circle. C212 denotes the centre of the circle that defines the shape of the leading edge 212 and R212 its radius. Likewise, C213 and C214 denote the centre of the circles that define the shape of the external surface 213 and of the internal surface 214, and R213 and R214 their respective radius.

In light of this secondary curvature, the straight line which passes through the points F and N, along which is measured the distance D21, is inclined in relation to the plane Pa of FIG. 6.

D22 denotes a distance measured parallel to the plane Pb between the point F and the point N. The distance D22 is the maximum distance, in a plane parallel to the plane Pb, between the straight line L and the leading edge 212. The distance D22 is the projection of the vector $\overrightarrow{FN}$ in the plane Pb. In the same way, the distance D21 is the projection of the vector $\overrightarrow{FN}$ in the plane Pa.

A second ratio having, as numerator, the distance D22 and, as denominator, the height H of the vane 21, is between 0% and 200%, more preferably between 10% and 40%.

Moreover, in the plane Pb, the external face 213 and the internal face 214 are symmetrical in relation to the plane P8. In other words, in the plane Pb, the point N on the leading edge 212 is located at mid-height between the connection points A and C.

In the example shown, the distance D22 is measured perpendicularly to the straight line L. Let d2 be the distance between the straight line L and any point P on the leading edge 212 and the straight line L, measured parallel to the plane Pb and perpendicularly to the straight line L. The distance d2 is the projection of the vector $\overrightarrow{PG}$ in the plane Pb. The distance d2 is measured between the points P and G, parallel to the plane Pb.

The distance d2 is zero at the point A and increases between the points A and N. At the point N, the distance d2 is maximal and is equal to the distance D22. Between the points N and C, the distance d2 decreases. At the point C, the distance d2 is zero. As such, along the leading edge 212 and between the points A and C, the distance d2, expressed as a function of the distance L1, comprises a single maximum and does not comprise any point of inflection. The derivative of the distance d2 in relation to the distance L1 is positive between the points A and N, cancels out at the point N and is negative between the points N and C. The second derivative of the distance d2 in relation to the distance L1 is negative between the points A and C.

The concavity of the secondary curvature of the vanes 21 is facing in the direction of rotation R1 of the runner R, when the machine M is operating in turbine mode. In other terms, in a section perpendicular to the trace of the average surface S on the crown 12, and in the view of FIG. 7, the external face 213 of the vanes 21 is convex and is facing opposite the direction of rotation R1, and the internal face 214 is concave and is facing in the direction as the direction of rotation R1.

Rp, θp and Zp denote the cylindrical coordinates of any point P on each leading edge 212.

Rp is the radius of the point P. Let Pz be the orthogonal projection of the point P on the axis Z. The radius Rp is measured between the points Pz and P, according to a radial direction. At the point A, the radius Rp is equal to the radius Ra. The radius Rp decreases between the points A and N. At the point N, the radius Rp is minimal and is equal to the radius Rn. The radius Rp increases between the points N and C. At the point C, the radius Rp is equal to the radius Rc.

Zp is the height of the point P. Az denotes the orthogonal projection of the point A on the axis Z. The height Zp of the point P is the distance between the point Az and the point Zp.

Cz denotes the orthogonal projection of the point C on the axis Z. Along the leading edge 212 and between the points A and C, the radius Rp, expressed as a function of the height Zp, comprises a single minimum and does not comprise any point of inflection. The derivative of the radius Rp in relation to the height Zp is positive between the points A and N, cancels out at the point N and is negative between the points N and C. The second derivative of the radius Rp in relation to the distance Zp is positive between the points A and C.

θp is the angle of the point P, in cylindrical coordinates. The angle θp has a positive sign identical to the direction of rotation R1 of the runner R, when the machine M is operating in turbine mode. Let Da be a radial straight line passing through the point A and the axis Z. For each vane 21, a radial straight line D0 is considered, passing through the axis Z, such that a positive angle θ0, measured starting from the straight line D0 and to the straight line Da, is equal to 45°.

In the cylindrical coordinate system, the angle θp of the point P is defined starting from the straight line D0 and to a straight line Dp passing through the points Pz and P.

As can be seen in FIG. 9, the angle θp is maximal at the point A and is equal to an angle θa. The angle θp decreases between the points A and N. At the point N, the angle θp is minimal and is equal to an angle θn. As can be seen in FIG. 10, between the points N and C, the angle θp increases. At the point C, the angle θp is maximal and is equal to an angle θc.

As such, along the leading edge 212 and between the points A and C, the angle θp, expressed as a function of the height Zp, comprises a single minimum and does not comprise any point of inflection.

The derivative of the angle θp in relation to their height Zp is negative between the points A and N, cancels out at the point N and is positive between the points N and C. The second derivative of the angle θp in relation to the height Zp is positive between the points A and C.

During transient operating phases of the installation I, for example during the starting of the installation I, the alternator 5 is not coupled to the electrical network as the rotation speed of the runner R is not stable and does not allow the alternator 5 to deliver an electrical signal of which the frequency is equal to the frequency of the electrical network. For example, in Europe, the frequency of the electrical network is equal to 50 Hz. Thanks to the hollow shape of the leading edge 212 of the vanes 21, the flow E causes little, even no turbulence and instabilities, which allows the rotation speed of the runner R to be stabilised for the purposes of coupling the alternator 5 on the network.

The stability of the rotation speed of the runner R of the invention can be observed on the graph of FIG. 4. For a relatively high head, the slope of the curve C1 at the point P1 is negative, such as that of the curve C2 at the point P2, which means that for the same head, the operation is stable for the runner 100 of prior art as well as for the runner R of the invention. On point P4, the slope of the curve C4 is negative, while the curve C3, at the point P3, is vertical, which means that the rotation speed of the runner of the invention is more stable than that of prior art. Finally, the curve C6 has a slightly negative slope at the point P6, while the slope of the curve C5, at point P5, is positive, which means that the rotation speed of the runner R of the invention is more stable than that of the runner 100 of prior art, for a relatively small head.

The shape curving towards the exterior of the veil of the vanes 21 makes it possible to accentuate the concavity of the leading edges 212 and to obtain a distance D21 that is relatively significant, without needing to hollow the leading edge 212 in an excessively pronounced manner, along the average surface S, in the direction of the trailing edge 211. This allows the hydraulic machine M, when it is operating in pump mode, to not excessively lose effectiveness.

No additional device is required in order to provide a satisfactory rotation speed, as the shape of the vanes 21 allows in itself the coupling of the alternator 5 on the network.

Alternatively, the straight line L is not parallel to the axis of rotation Z of the runner R. For example, the point C can be offset towards the trailing edge 211 in relation to the point A.

Alternatively, the concave shape of the leading edges 212 is defined by a portion of ellipse or of parabola, even by any curve.

In another alternative, the shape curved towards the exterior of the leading edge 212, of the external face 213 and of the internal face 214 of a vane 21 is defined by a portion of ellipse or of parabola, even by any curve.

Alternatively, only certain vanes 21 have their leading edge concave.

Alternatively, the point N is not exactly at mid-height between the points A and C. The orthogonal projection of the intermediate point N on the straight line L is then located in a zone which extends, along the straight line L, starting from the middle F of the straight line L and on either side of the middle F by being centred on the middle. The height H2 of the zone is less than 80% of the height H of the vane 21, more preferably less than 10%.

Furthermore, the various alternatives and embodiments described hereinabove can be combined together, entirely or partially, in order to give rise to other implementations of the invention.

The invention claimed is:

1. A Francis runner for a hydraulic machine, intended to be passed through by a forced flow of water, comprising: a wheel which is rotationally symmetrical about an axis of rotation of the runner, a crown which is rotationally symmetrical about the axis of rotation and facing the wheel, a plurality of inwardly curved vanes, integral with the wheel and with the crown and each having a central edge in the vicinity of the axis of rotation and a peripheral edge, opposite the central edge, which extends between the wheel and the crown and which is intended to be passed through firstly by the flow of water when the hydraulic machine is operating in turbine mode, the peripheral edge of at least one vane being curved, with the concavity thereof facing toward the outside of the runner, the peripheral edge comprising: a first distance, measured between any point on the peripheral edge and a straight line passing through, on the one hand, a first connection point between the peripheral edge and the wheel and, on the other hand, a second connection point between the peripheral edge and the crown, the first distance being at a maximum at an intermediate point on the peripheral edge, and a radius of the intermediate point being less than a radius of the first connection point, wherein the radius of the intermediate point is less than a radius of the second connection point.

2. The runner according to claim 1, wherein the intermediate point is the farthest away from the straight line.

3. The runner according to claim 1, wherein an orthogonal projection of the intermediate point on the straight line is located in a zone which extends along the straight line and which is centered on the middle of the straight line and wherein a height of the zone is less than 80% of a height of each vane, measured between the first connection point and the second connection point.

4. The runner according to claim 1, wherein the peripheral edge of the vanes is curved.

5. The runner according to claim 4, wherein the peripheral edge of the vanes is in the shape of a portion of a circle, an ellipse, or a parabola.

6. The runner according to claim 1, further comprising a first ratio, having: as denominator, a height of a vane, measured between the first connection point and the second connection point, as numerator, a maximum distance between the straight line and the peripheral edge, wherein the first ratio is between 0% and 200%.

7. The runner according to claim 1, wherein the intermediate point of the peripheral edge is located midway between the first and second connection points.

8. The runner according to claim 1, wherein in a first plane, parallel to the axis of rotation and perpendicular to a second plane which passes through an intersection between the crown and an average surface of the vane located between an external face and an internal face of the vane, and which extends the average surface, the external face is convex and the internal face is concave.

9. The runner according to claim 8, wherein, in the first plane, the shape of the external face and the shape of the internal face is defined by a portion of a circle, an ellipse, a parabola, or any other curve.

10. The runner according to claim 8, further comprising a second ratio, having: as denominator, a height of the vane, measured between the first connection point and the second connection point, as numerator, a maximum distance, measured parallel to the first plane, between the straight line and the peripheral edge, wherein the second ratio is between 0% and 200%.

11. The runner according to claim 8, wherein in the first plane, the intermediate point on the peripheral edge is located midway between the first and second connection points.

12. The runner according to claim 8, wherein in the first plane, the peripheral edge is curved, with the concavity thereof facing in the same direction as the direction of rotation in turbine mode of the runner.

13. The runner according to claim 8, further comprising a second distance, measured parallel to the first plane, between any point on the peripheral edge and the straight line, wherein the second distance is maximal at the intermediate point.

14. A hydraulic machine comprising a runner according to claim 1.

15. A hydraulic machine comprising a runner according to claim 8, wherein, when the hydraulic machine is operating in turbine mode, the flow hits the external face of the vanes.

16. A power-conversion installation comprising at least one hydraulic machine according to claim 14.

* * * * *